United States Patent [19]
McMillon

[11] Patent Number: 5,368,622
[45] Date of Patent: Nov. 29, 1994

[54] AIR CONDITIONER FILTER FRAME

[76] Inventor: Donald C. McMillon, P.O. Box 187, Snyder, Tex. 79549

[21] Appl. No.: 113,847

[22] Filed: Aug. 27, 1993

[51] Int. Cl.5 .................. B01D 35/00; B01D 46/00
[52] U.S. Cl. ........................ 55/497; 55/499; 55/501
[58] Field of Search .............. 55/490, 495, 497, 499, 55/501, 503, 504, 511

[56] References Cited

U.S. PATENT DOCUMENTS

| | | | |
|---|---|---|---|
| 2,058,669 | 10/1936 | Dollinger | 55/499 |
| 2,135,863 | 11/1938 | Walker | 55/499 |
| 3,076,303 | 2/1963 | Durgeloh | 55/511 |
| 3,111,489 | 11/1963 | Getzin | 55/503 |
| 3,494,113 | 2/1970 | Kinney . | |
| 3,675,402 | 7/1972 | Weed . | |
| 3,823,533 | 7/1974 | Alverson et al. | 55/504 |
| 4,125,386 | 11/1978 | Philipp | 55/511 |
| 4,133,661 | 1/1979 | Strnad | 55/511 |
| 4,334,899 | 6/1982 | McConnell | 55/501 |
| 4,692,177 | 9/1987 | Wright et al. | 55/511 |
| 4,919,123 | 4/1990 | Jackson et al. . | |
| 5,087,276 | 2/1992 | Snyder . | |
| 5,114,448 | 5/1992 | Bartilson . | |

FOREIGN PATENT DOCUMENTS

| | | | |
|---|---|---|---|
| 153803 | 7/1938 | Austria | 55/501 |
| 302527 | 1/1955 | Switzerland | 55/501 |

Primary Examiner—Charles S. Bushey
Attorney, Agent, or Firm—Wendell Coffee

[57] ABSTRACT

A filter holder is formed with a rectangular frame. The frame has two elements which are telescoped together. The filter is held within a channel when the frame is assembled. The channel is formed with a lip from each of the two elements. A retaining screen is attached to the lips of one of the elements to prevent the filter from billowing.

1 Claim, 2 Drawing Sheets

AIR CONDITIONER FILTER FRAME

CROSS REFERENCE TO RELATED APPLICATION

None, however, Applicant filed Disclosure Document No. 330,145 on May 10, 1993 which document concerns this application; therefore, by separate paper it is respectfully requested that the document be retained and acknowledgment thereof made by the Examiner. (MoPEP 1706)

BACKGROUND OF THE INVENTION (1) Field of the Invention

This invention relates to residential-type air conditioners and more particularly to replaceable filters therefor. An ordinary householder is one having ordinary skill in this art.

(2) Description of the Related Art

Before this invention the use of air filters for residential-type air conditioners was well known.

Also before this invention it was recognized the desirability of providing filter frames where the filter media or the filter itself could be placed in a frame to be used in an air-conditioning unfit. For example, SNYDER U.S. Pat. No. 5,087,276, discloses filter frames which are channel shaped so that by sliding the sides of the frame the size and the shape of the filter can be adjusted. Also SNYDER recognized the desirability of placing mesh over the filter.

WEED, U.S. Pat. No. 3,675,402, also recognized the desirability of an adjustable filter frame with different elements in a channel shape telescoped together. The elements were connected together with a clamp to hold a filter. WEED also recognized the desirability of having a screen placed on both sides of the filter to keep it from billowing.

BARTILSON, U.S. Pat. No. 5,114,448, discloses a channeled filter holder with mesh to hold the filter media in place.

The prior patent by this inventor, U.S. Pat No. 5,199,414 discloses a filter to be held within channels of hammock-type filter.

SUMMARY OF THE INVENTION (1) Progressive Contribution to the Art

This application discloses a filter holder which is convenient for replacing the filter element. Some difficulty is had placing the filter within channels.

According to this filter the holder consists of two elements, each of rectangular shape that may be telescoped together. Each of the elements has a lip to hold the edges of the filter in place so that when assembled the filter is held within a channel; one of the lips of the channel being on one of the rectangular elements and the other lip of the channel on the other rectangular element. The two elements are made to telescope together to form a unit which is channeled such as shown by either SNYDER, or WEED, or applicant's prior patent U.S. Pat. No. 5,199,414, when assembled. However to replace the filter the two elements are separated so that the filter may be laid within one of the elements and the other element telescoped into place, greatly simplifying the process of filter replacement.

A mesh is placed upon at least one of the elements which would be on the down-stream side of the air flow to prevent the air flow from billowing the filter.

(2) Objects of this Invention

An object of this invention is to provide a filter holder by which filters can be quickly and easily replaced.

Another object of this invention is to provide a framework for accomplishing the above, said frame being constructed to use different types of filter elements or media.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require skilled people to install, operate, and maintain.

The specific nature of the invention, as well as other objects, uses, and advantages thereof, will clearly appear from the following description and from the accompanying drawings, the different views of which are not necessarily scale drawings.

DESCRIPTION OF THE PREFERRED EMBODIMENT

Figure 2:
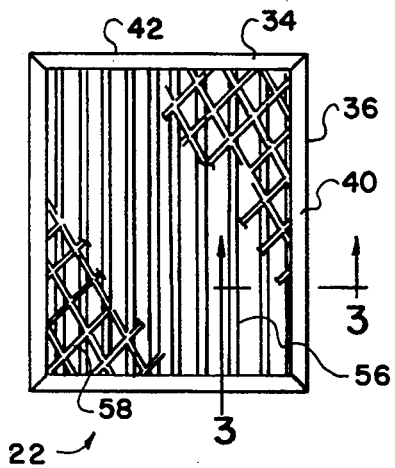
FIG. 2 is a top plan view of a filter unit according to this invention.
Figure 1:
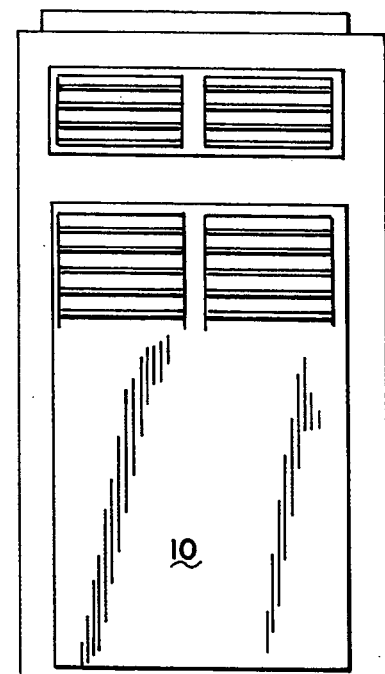
FIG. 1 is a front elevational view of a fan compartment with the cover removed showing an air conditioner with an embodiment of this invention.

Referring to FIG. 1 there may be seen a front elevational view of an air conditioner according to this invention. The air-conditioner unit has a heat transfer compartment 10 above fan compartment 12. The fan compartment has fan 14 attached to top structure 18. Bottom structure 20 of the fan compartment 12 has air inlet opening 16 therein. With the fan in operation, the air is drawn in through the air inlet opening 16 through filter unit 22 and into the fan. The fan blows the filtered air through an opening (not shown) in the top structure 18.

The fan compartment 12 also has closed side structure 24 and open side structure 26.

Although the air intake has been described as being in the bottom structure 20, it will be understood by those skilled in the art, that the air intake 16 could be from either of the side structures, as for example shown in GREINER U.S. Pat. No. 3,218,784.

The compartment also has back structure 28 and a front structure. The front structure opens for servicing the fan and filter but a closure is over the opening in the front structure.

The filter unit 22 is rectangular and larger than the air-inlet opening 16 which is also rectangular. The filter unit 22 lies flat against the bottom structure 20.

The filter unit 22 includes filter holder 34. The filter holder has two elements: outer element 36 and inner element 38. Each of the elements is rectangular and has four sides. The outer element has two long sides 40 and two short sides 42. Likewise, inner element has two long sides 44 and two short sides 46. Although this description speaks of a long side and short side, those skilled in the art understand some units 10 are designed to use filter units 22 with the sides of equal length so that the unit rectangle is a square. Thus the short sides might be considered the front and back and the long sides be the sides.

Each of the sides 40, 42, 44 and 46 has two legs identified on the outer element 36 as band leg 48 and holder or lip leg 50. On the inner element the legs are identified as band leg 52 and holder or lip leg 54.

The band legs form a perimeter of the rectangle and the lip legs extending inward from the band legs.

The band legs 48 and 52 have a width about equal to the thickness of filter 56. The lip legs 50 and 54 have a width which gives rigidity to the element and is sufficient to at least partially hold the filter 56 between the two elements. Preferably the lip legs are wider than the band legs. With the filter 56 between the two elements the elements will be telescoped together to form a snug but removable fit. I.e., the band legs 48 of the outer element 36 will be outside the band legs 52 of the inner element 38 but the band legs will be in contact with one another. The two elements can be separated by hand, pulling them apart. The elements 36 and 38 are sufficiently in contact that they do not readily come apart in normal, careful handling.

One of the elements which will be on the downstream side of the air flow, which will be on the top, as seen in FIG. 1, will have retaining screen or grid or mesh 58 thereover. The retaining screen or mesh 58 will be attached by suitable means to the inside surface of the lip leg. The inside surface is the surface that contacts the filter 56. This down-stream side is also the fan side.

Figure 4:
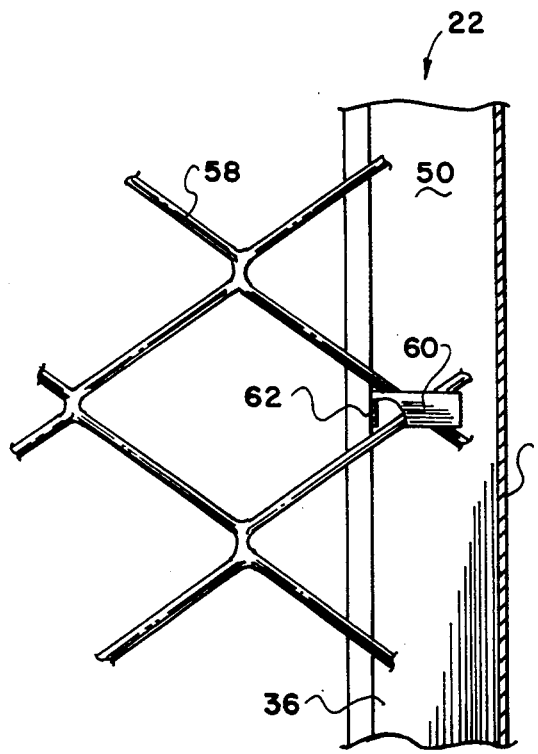
FIG. 4 is a detail of the attachment of the grid to the frame.
Figure 5:
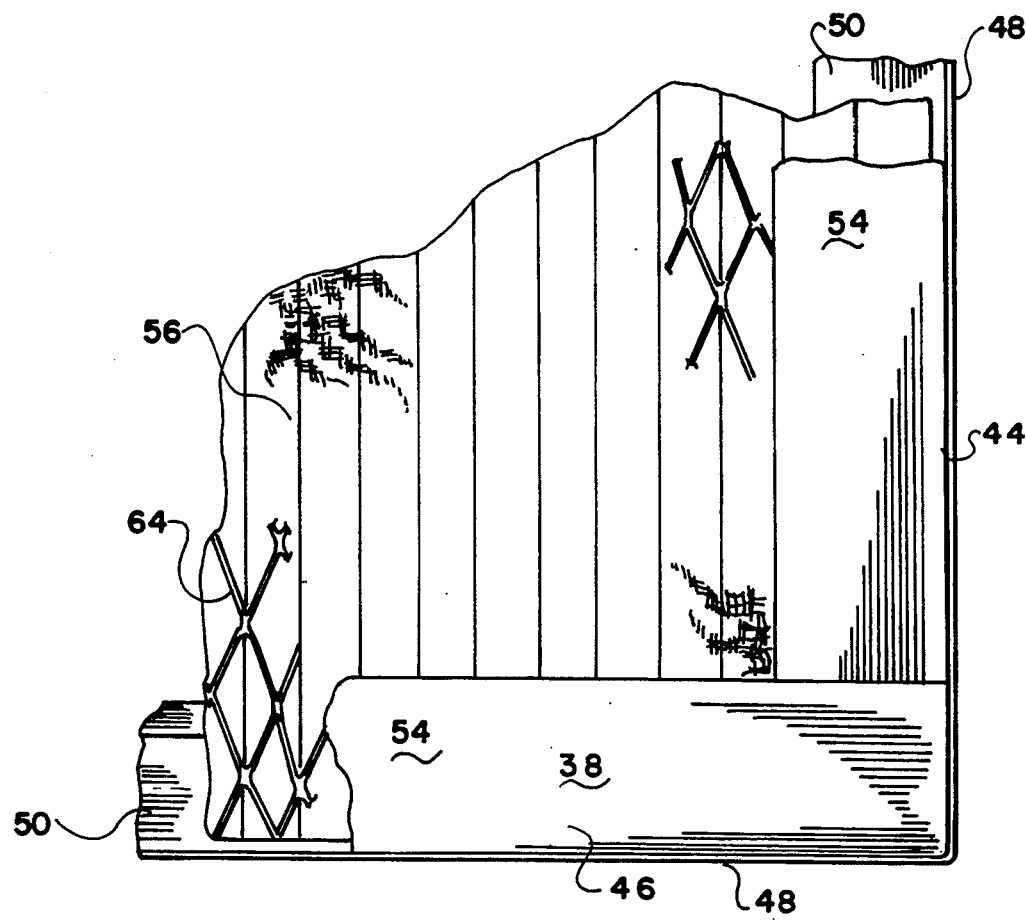
FIG. 5 is a partial bottom plan of a portion of the filter unit.
Figure 3:
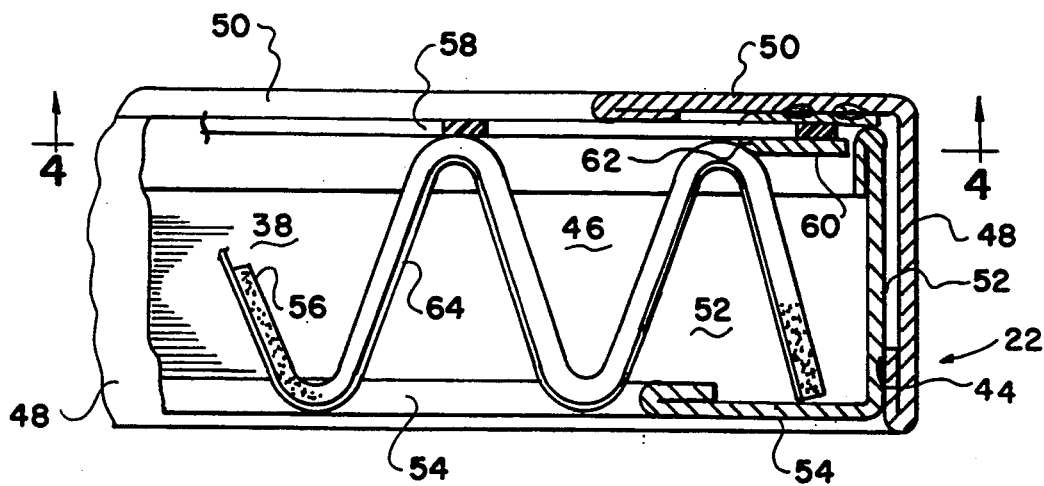
FIG. 3 is a cross section through a side of the filter frame taken substantially on line 3—3 of FIG. 2.

As seen in FIGS. 3 and 4, the mesh 58 is held by clips 60. The clip is a thin strap of soft metal such as copper or low-carbon iron which is pliable or ductile or deformable or plastic so that it bends readily. The clip, in use, is in a U-shape with two legs. One leg is attached as by spot welding to the inside of the lip leg 50 of the outer element 36. There will be a plurality of the clips 60 spaced around, for example a total of eight or twelve with two or three on each of the sides. After the mesh has been placed in position the clips are bent over the mesh so that bight 62 is toward the middle of the rectangle. Therefore a portion of the mesh will be within the clip and thus held in place.

The screen or mesh 58 will be relatively stiff. I have found that plastic mesh having approximately 3" diamonds, as used by construction workers to place around open man holes, is a suitable material for the mesh 58. The purpose of the mesh is to prevent the movement of air through the filter from puffing or billowing or causing the filter 56 to move out of the filter holder 34.

Inasmuch as most filter pads 56 as used in residential units are about 1" thick the band leg width will be about 1". The legs will all have a uniform thickness for convenience in fabrication. The length of the long side 40 of the outer element 36 will be approximately equal to the length of the long side 44 of the inner element 38, plus four times the thickness of the legs with an additional amount so that the elements form a snug fit. Likewise the length of the short side 42 of the outer element 36 will be equal to the length of the short side 46 of the inner element 38, plus four times the thickness of the legs plus an amount so that the elements fit together snugly but removably. It will be understood, particularly from the drawing FIG. 3, that the edges of the legs of the element are doubled back to add rigidity to the frame and also to prevent sharp edges, which might otherwise pose a hazard to the user of the filter holder.

To replace a filter, the filter unit 22 is removed from the air conditioning unit. The elements 36 and 38 are separated and the old used filter 56, removed and discarded. A new filter 56 is preferably placed within the element having the screen or mesh 58 thereon so that the filter unit is held in place while the elements are handled to telescope the elements together to hold the filter unit between the two elements. Normally the filters will be constructed to have sufficient strength so that the filters are held in position when they are placed in the furnace. I.e., the filter will have sufficient strength to prohibit it from sagging down through the air inlet opening 16 by gravity. If desired for the design, a mesh or screen 64 can be placed upon the bottom side of the filter unit which is to say the side opposite the fan side when the air filter is in use. However, normally this second screen on the other element will not be necessary.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. A filter unit adapted to be used in a space heating and air-conditioning unit having
    a) a heat transfer compartment above
    b) a fan compartment having
        i) a top structure,
        ii) a bottom structure,
        iii) two side structures,
        iv) a back structure, and
        v) a front structure,
    c) a fan attached to the top structure,
    d) a removable closure over an opening in the front structure, and
    e) an air inlet in at least one of the bottom and side structures;
    f) said filter unit comprising:
    g) a filter holder having a rectangular outer element and a rectangular inner element,
    h) said outer element and inner element form a rectangular frame having a perimeter,
    j) each element having
        i) four sides connected together as a rectangle,
        ii) each side having two legs forming an L-shaped cross section with
        iii) one of the legs called a band leg having a width of about the thickness of a filter to be held,
        iv) the other of said legs called a lip leg having a width of at least as much as the width of the band leg,
        v) said band leg forming the perimeter of the rectangle and the lip leg extending inward from the band leg, the lip leg thus forming a lip,
        vi) each of the legs each having a thickness which is equal to the thickness of the other leg;

k) the outer element having a length and width equal to a length and a width of the inner element plus more than four times the thickness of the legs, so that the elements may telescope together snugly,
l) a rectangular filter between the inner and outer elements which are removably and snugly telescoped together,
m) lip legs on the elements forming means to hold the filter in place between the elements,
n) a retaining screen on one of the elements to hold the filter in place between the elements,
o) a plurality of U-shaped clips,
p) each clip having a leg attached to one of the lip legs,
q) each clip bent over a portion of the retaining screen thereby holding it in place, and
r) said retaining screen extending over the area of the rectangle.

* * * * *